United States Patent
Bates et al.

(10) Patent No.: US 8,064,600 B2
(45) Date of Patent: Nov. 22, 2011

(54) ENCODED DIGITAL VIDEO CONTENT PROTECTION BETWEEN TRANSPORT DEMULTIPLEXER AND DECODER

(75) Inventors: Matthew D. Bates, Austin, TX (US); Lance G. Hehenberger, Leander, TX (US)

(73) Assignee: Trident Microsystems (Far East) Ltd., Grand Cayman (KY)

( * ) Notice: Subject to any disclaimer, the term of this patent is extended or adjusted under 35 U.S.C. 154(b) by 638 days.

(21) Appl. No.: 12/144,319

(22) Filed: Jun. 23, 2008

(65) Prior Publication Data

US 2008/0317249 A1  Dec. 25, 2008

Related U.S. Application Data

(60) Provisional application No. 60/946,114, filed on Jun. 25, 2007.

(51) Int. Cl.
*H04K 1/00* (2006.01)
(52) U.S. Cl. .................................................. 380/255
(58) Field of Classification Search ................ 380/255; 713/189, 193
See application file for complete search history.

(56) References Cited

U.S. PATENT DOCUMENTS

| | | | | |
|---|---|---|---|---|
| 5,917,910 A | * | 6/1999 | Ishiguro et al. | 705/57 |
| 2004/0098270 A1 | * | 5/2004 | Obayashi et al. | 705/1 |
| 2007/0042796 A1 | * | 2/2007 | Wenzel et al. | 455/507 |
| 2007/0042976 A1 | * | 2/2007 | Strassmann | 514/43 |

OTHER PUBLICATIONS

Documents from counterpart PCT Appln. No. PCT/US08/67886: International Search Report dated Mar. 12, 2009, Written Opinion dated Mar. 5, 2009, and International Preliminary Report on Patentability dated Jan. 5, 2010.

* cited by examiner

*Primary Examiner* — Benjamin Lanier
*Assistant Examiner* — Simon Kanaan
(74) *Attorney, Agent, or Firm* — DLA Piper LLP (US)

(57) ABSTRACT

A system for encrypting and decrypting data is provided. The system includes a client for receiving a data packet, setting a value of a crypto bit, and transmitting the data packet over a system bus. A crypto module receives the data packet from the system bus and performs a cryptology function on the data packet based on a first value of the crypto bit. A memory controller receives the data packet from the system bus and performs non-cryptology functions on the data packet based on a second value of the crypto bit.

20 Claims, 2 Drawing Sheets

ENCODED DIGITAL VIDEO CONTENT PROTECTION BETWEEN TRANSPORT DEMULTIPLEXER AND DECODER

RELATED APPLICATIONS

The present application claims priority to U.S. Provisional patent application 60/946,114, entitled "Encoded Digital Video Content Protection Between Transport Demultiplexer And Decoder," filed on Jun. 25, 2007, which is hereby incorporated by reference for all purposes.

FIELD OF THE DISCLOSURE

This disclosure relates to digital video encoding, and more specifically to encoded digital video content protection between a transport stream processor and a decoder.

BACKGROUND OF THE INVENTION

Data such as audiovisual content is typically encrypted in order to prevent unauthorized users from obtaining access to the data. For example, audiovisual content stored on a digital video disk (DVD) is often encrypted to prevent unauthorized users from being able to copy and distribute the audiovisual content. Nevertheless, it is still possible to access data after it has been decrypted, such as by accessing the data on a system bus or a storage device after it has been decrypted through existing system interfaces that provide external access to the system bus or storage device, or in other manners.

SUMMARY OF THE INVENTION

Disclosed exemplary embodiments of the present invention perform encryption and decryption of data between system components that are protected from being modified by external access, so as to prevent the data from unauthorized access.

In one exemplary embodiment of the present invention, a system for encrypting and decrypting data is provided. The system includes a client for receiving a data packet, setting a value of a crypto bit, and transmitting the data packet over a system bus. A crypto module receives the data packet from the system bus and performs a cryptology function on the data packet based on a first value of the crypto bit. A memory controller receives the data packet from the system bus and performs non-cryptology functions on the data packet based on a second value of the crypto bit.

Those skilled in the art will further appreciate the advantages and superior features of the invention together with other important aspects thereof on reading the detailed description that follows in conjunction with the drawings

DETAILED DESCRIPTION OF PREFERRED EMBODIMENTS

Figure 1:
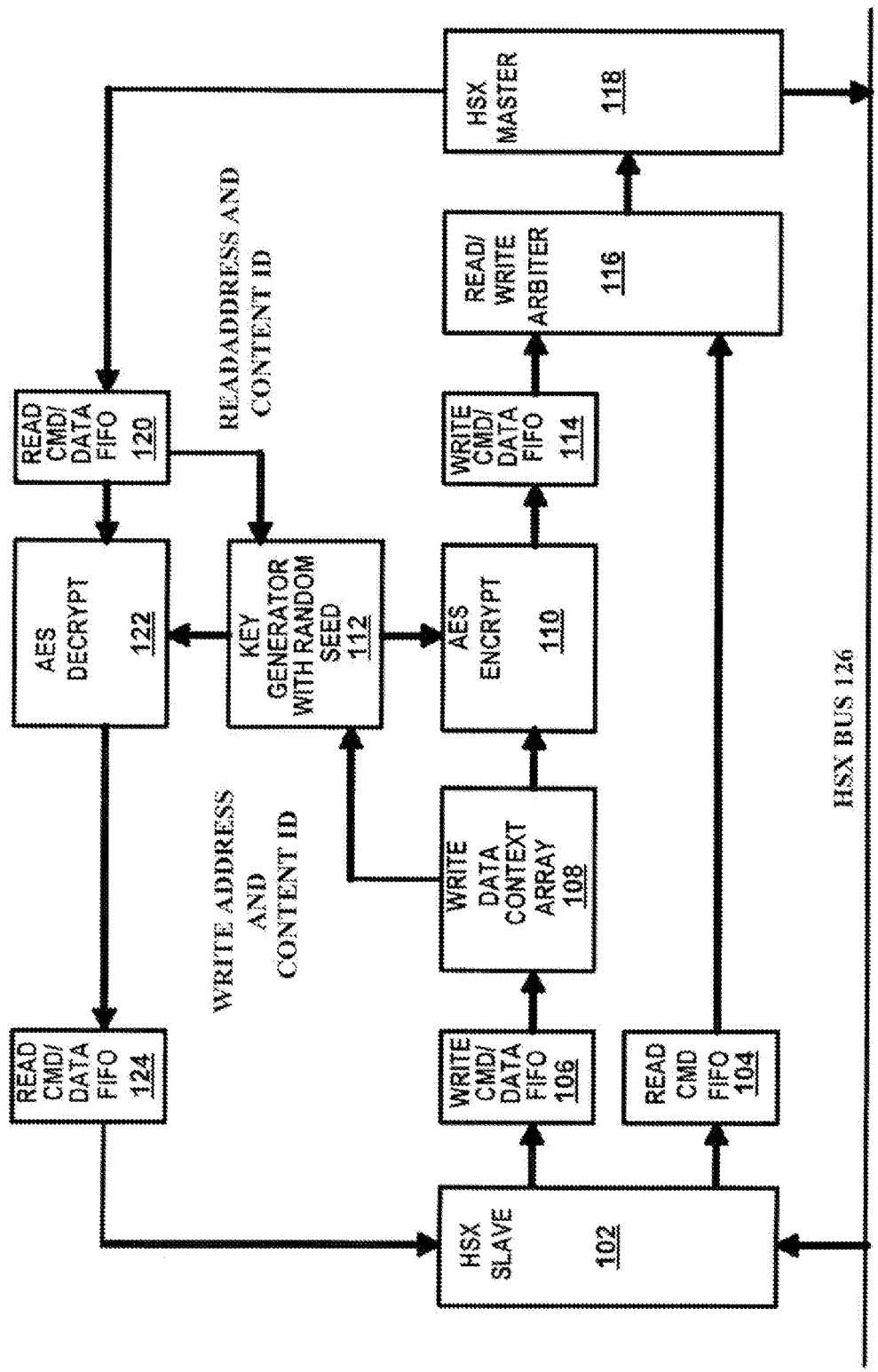
FIG. 1 is a diagram of a system for a crypto proxy module in accordance with an exemplary embodiment of the present invention.

In the description that follows, like parts are marked throughout the specification and drawings with the same reference numerals, respectively. The drawing figures might not be to scale, and certain components can be shown in generalized or schematic form and identified by commercial designations in the interest of clarity and conciseness.

FIG. 1 is a diagram of a system 100 for a crypto proxy module in accordance with an exemplary embodiment of the present invention. System 100 can be used to assist content protection in digital consumer equipment (CE) or for other suitable purposes. Content can be digital media such as broadcast television programming, pay per view (PPV) movies, digital video disk (DVD) content, Internet streaming video, or other suitable content.

Content protection is used to protect the content against unauthorized access, such as viewing of content without authorization, unauthorized copying of authorized content, or other unauthorized access.

System 100 can be implemented in hardware or a suitable combination of hardware and software, and can be part of a very large scale integrated circuit "System on a Chip" (SoC). As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications or on two or more processors, or other suitable software structures. In one exemplary embodiment, software can include one or more lines of code or other suitable software structures operating in a general purpose software application, such as an operating system, and one or more lines of code or other suitable software structures operating in a specific purpose software application.

Content protection can be provided as part of overall system security, which can include system security to prevent unauthorized tampering and introduction of malicious code, system security to prevent unauthorized use of the consumer equipment for other applications (which can be an important consideration when equipment is subsidized by a content provider), secure delivery and protection of the keys required to view content, data protection to protect users' private information, or other suitable functions. Some of these functions can be performed by other components within the system. System 100 does not require any of these other security components, and can provide content protection even where content protection is compromised in these other areas. In one exemplary embodiment, a host CPU running the consumer application can be compromised with unauthorized code in an unauthorized attempt to access content, and system 100 can protect against unauthorized access even in a "hacked" system where someone may have total control over the host CPU.

System 100 prevents unauthorized viewing and copying of authorized content using data encryption. Content is generally encrypted for distribution (e.g. DVDs) or transmission (digital cable TV) over physically exposed networks, and cannot be decrypted and viewed in these contexts without the correct key, such that the key is not available unless the user is authorized. However once the content is decrypted for authorized viewing it is vulnerable to unauthorized copying. Even if the decrypted content is re-encrypted or protected before leaving the consumer equipment, such as by using Macrovision™ for analog TV output or High-bandwidth Digital Content Protection (HDCP) for digital output, there is still the possibility of tampering with the consumer equipment and accessing the internal decrypted content. System 100 can be used to keep decrypted data unavailable to either internal access (e.g. by unauthorized subsystems such as the host CPU) or to external access (e.g. by probing). System 100 utilizes a combination of hardware restrictions and re-encryption of data before it is stored in external memory (DDR).

System 100 utilizes anti-copying technologies that are enforced at its outputs, and provides protection from being compromised if one or more of these protection schemes is disabled. System 100 can be utilized in a multi-program decoder (such as for Picture in Picture (PIP) or multi-room TV support), and can maintain the correct association throughout the system from the time that the elementary data in the MPEG or other suitable transport stream is first demultiplexed and decrypted all the way to the final output of the video signal. In one exemplary embodiment, if one program is a high value PPV movie protected by Macrovision™ and another program is an unprotected free preview channel, system 100 prevents a compromised host CPU from swapping the two programs at some convenient point in the pipelines, such that the PPV movie becomes unprotected. Because these types of association are difficult to securely enforce all the way through a complex and highly programmable system, instead of enforcement at every step of the pipeline, enforcement is utilized at the start point and end point of a pipeline. To prevent unauthorized remapping of the pipeline midway, system 100 utilizes memory encryption at each pipeline stage with a different content ID for each program. Since the encryption is ID dependent, any attempt to use the incorrect data or swap or alter the ID will result in useless data returned from the memory controller.

Furthermore, to prevent malicious code from compromising the system by reusing the same content ID for multiple programs, and subsequently swapping the content at some stage of the pipeline, the content IDs are forced to be unique at the point of origin (the transport stream processor).

Encoded content is considered higher value than decoded content because encoded content is compressed and therefore easier to capture and store with easily available technology. For example, a compressed audio/video stream in system memory can be written directly to a hard disk for subsequent distribution or playback. However decoded/decompressed data has a considerably higher data rate and is impractical to write to non-volatile storage without first recompressing/re-encoding the data, which requires advanced technology (especially in the case of High Definition video) not present in the system, and which inevitably results in significant loss of quality.

System 100 can be used to perform memory encryption for elementary (such as MPEG compressed audio and video) data, so that elementary data is never stored in the clear in the external Dual Data Rate system memory (DDR). Light encryption (or "obfuscation") by the system memory controller (MC) is not sufficiently strong enough against determined attacks. State of the art encryption of content can be achieved using the standard encryption algorithm known as 128 bit Advanced Encryption Standard (AES), which is not usually practical in a typical high-performance MC due to the high latency introduced.

System 100 can be characterized as a "proxy" module because it performs memory transactions on behalf of the memory controller client. In this manner, it is not necessary to embed an AES engine into the memory controller, as system 100 intercepts client to memory controller transactions, buffers the data and performs the encryption/decryption operation on the data and then originates a new transaction to the memory controller, which eliminates latency that would otherwise be seen by the client.

System 100 can include both a high speed transfer (HSX) master and slave on HSX bus 126. HSX bus 126 is the system bus for high speed data transfer to and from the external DDR and between high bandwidth on-chip modules.

To perform encryption, a transport stream processor (TSP) requests that the memory transaction be handled by system 100 rather than the memory controller by using an additional HSX attribute bit. System 100 can respond to requests where this bit is set, whereas the memory controller will not. System 100 can then encrypt the data and then issue a new HSX transaction to the memory controller using HSX master 118.

To perform decryption, the audio and video decoders can also request that the memory transactions be handled by system 100 rather than the memory controller, which is similar to the encryption case except that system 100 will not start the decoders' read transactions until system 100 to memory controller read has started and system 100 has decrypted the first block of data.

HSX master 118 is a bus master that supports the following additional attributes for transactions (other bus master modules unrelated to content can have attributes that are hardwired to zero). These attributes are in addition to the standard bus signals associated with a transaction (such as address, data, read/write, and other suitable signals):

HSX_ATTR_BITS_PROTECTED_CONTENT_ID 41:34

HSX_ATTR_BITS_PROTECTED_ENCODED_CONTENT 33

HSX_ATTR_BITS_PROTECTED_DECODED_CONTENT 32

System 100 uses the HSX_ATTR_BITS_PROTECTED_CONTENT_ID and HSX_ATTR_BITS_PROTECTED_ENCODED_CONTENT bits while passing through the ID and remaining bits. The HSX_ATTR_BITS_PROTECTED_DECODED_CONTENT bit is not used by system 100 but is used to continue the content protection scheme through the remainder of the system all the way to the audio and video outputs.

Only privileged devices are permitted to set the HSX_ATTR_BITS_PROTECTED_ENCODED_CONTENT attribute bit. Privileged devices are simply those modules that are inherently trusted to use the attribute bits appropriately and to not expose the content. These privileged devices are restricted to the transport stream processor and the audio/video decoders. In particular, the host CPU will not be privileged because it is the most likely target of an attack. Furthermore, the source device (such as the transport stream processor) can enforce the attribute bit as appropriate whereas the host CPU can optionally turn on the attribute in the decoders. Therefore, the host CPU cannot force encryption to be turned off when the data is written but can inform the decoders when they need to turn it on in order to be able to read the data.

AES encrypt 110 applies a suitable encryption algorithm, such as standard AES with a 128 bit key operating on 16 byte blocks. Encryption is performed in Electronic Code Book (ECB) mode, such as where there is no dependency between encryption blocks to allow random access by clients of system 100. AES encrypt 110 can process a total throughput of approximately 600 Mbps or other suitable data rates Key generator with random seed 112 generates a key at power up from a random number from a random number generator and is unique compared to any other keys generated. The key is delivered directly to system 100 with no visibility by anything else in the system. The key is further modified by the address of the data block and content ID using a hashing algorithm before being applied to the data.

System 100 supports multiple encryption write contexts, defined by the content ID, to allow multiple programs to be partitioned in the system. Each content ID produces a different key for the same address.

In one exemplary embodiment, algorithm can include the steps of concatenating the address and the 8 bit content ID, replicating a predetermined number of times and exclusive or with the random number generator.

The encryption block synchronization is address based, such as by using 16 byte encryption blocks that are aligned to 16 byte address boundaries, or other suitable functions.

The source device (such as the transport stream processor) can be independent of system 100 encryption block boundaries and can issue write transactions that are both partial and unaligned compared to these boundaries, and can switch to other "contexts" (other elementary streams) without regard to these boundaries. Therefore, contexts are necessary to maintain the state of partial encryption blocks because AES cannot operate on a block until the block is complete.

System 100 can hold a suitable number of write contexts. In one exemplary embodiment, sixteen elementary streams can be decoded simultaneously. Each system 100 write context can hold partial bytes from a previous transaction. In one exemplary embodiment, for 32 bit clients, system 100 can hold up to 12 bytes and for 64 bit clients system 100 can hold up to 8 bytes. A context match can occur if a subsequent write starts at the address immediately following the context's end address. In this exemplary embodiment, partial words (with not all of the byte enables set) can be unsupported. For example, where the transport stream processor can handle partial words internally and not expose them to system 100, this function is performed by only writing full words and holding partial words internally until more bytes arrive to complete the word.

If a write context miss occurs, a new context can be used. If no free contexts are available, the new context slot can be determined using an LRU ("least recently used") algorithm or in other suitable manners. The context that is overwritten can be discarded (for cryptographical reasons it is not desirable to simply pad and encrypt the partial data without using a more complex residual block handling algorithm). A context overwrite can optionally generate an exception interrupt to the host CPU.

A context is considered closed if a transaction ends on a suitable boundary, such as a 16 byte boundary, which is used to handle the buffer wrap condition. In this exemplary embodiment, the write to the last 16 bytes in a circular buffer can be aligned to close the context. Without this process, system 100 would accumulate dangling contexts at the end of every circular buffer.

Write transactions may not complete for an indefinite period if they do not end on a 16 byte boundary. If this situation cannot be tolerated then the client (such as the transport stream processor) can explicitly flush the write transaction by padding to a 16 byte boundary or other suitable size boundaries (noting the cryptographical risk of doing this). However, if the client does this it will not be able to later resume the transaction (i.e. attempt to overwrite the padding) without rewriting the correct data from the beginning of the 16 byte block (because the associated context will have been closed).

If there is no context available for a write transaction and it does not start on a 16 byte boundary or other suitable size boundaries, system 100 can discard the data, and optionally generate an exception interrupt to the host CPU.

In one exemplary embodiment, system 100 does not support read contexts and therefore cannot handle unaligned read accesses. In this exemplary embodiment, reads can be 16 byte aligned and a multiple of 16 bytes in length. These read restrictions can be placed on the decoders but are not likely to be burdensome, because unlike the transport stream processors, the decoders already make suitable transactions.

System 100 can optionally generate an exception interrupt to the host CPU if there is a read/write collision, which can occurs when a read occurs from an address that is contained within an open write context (which is an exception because the write won't have occurred yet and thus there is no way to read the data). This condition can be prevented by not allowing memory buffers to be completely drained (i.e. the decoders need to wait if the buffer levels are below a certain threshold).

System 100 adds latency to read and write transactions, depending on at least the length of the transaction and the throughput of the encryption engine. In one exemplary embodiment, the maximum transaction size handled by system 100 can be limited to 256 bytes.

System 100 includes an "advanced" HSX protocol that allows it to support up to two outstanding write requests and two outstanding read requests. The read and write pipelines through system 100 can be independent and each pipeline can hold at least two requests, such that system 100 can accept up to two write requests from clients and can initiate up to two write requests to the memory controller, while at the same time accepting up to two read requests from clients and initiate up to two read requests to the memory controller.

The transport stream processor enforces encryption of audio and video elementary streams, depending on the type of conditional access used.

System 100 includes two mostly independent data paths, one for read operations and one for write operations. Some sub-modules are shared between the two data paths, as discussed below. HSX slave module 102 is the bus interface to the system bus and is shared by both read and write operations initiated by a client. Similarly, HSX master module 118 is the bus interface to the system bus and is shared by both read and write operations initiated by system 100.

On receipt of a write request from a client, an internal write command can be generated and placed in a two-deep command first-in, first-out (FIFO) buffer 106. The associated data can also placed in an input data FIFO buffer 106 large enough to hold two entire write transactions (up to 512 bytes in one exemplary embodiment). The context is then matched to an existing context held in write data context array 108. For matching and new contexts, the data is delivered to AES encryption engine 110 for encryption in 16 byte blocks or other suitable sized blocks. The encrypted data is stored in output write data FIFO buffer 114 together with an associated internally generated write command. When the original write data, excluding any partial block remaining in write context data array 108, has all been encrypted and stored in output write data FIFO buffer 114 (which can be 512 bytes or other suitable sizes) a new bus transaction is requested to the HSX master module 118 by read/write arbiter 116, which is arbitrated between read and write requests since HSX master module 118 is shared. Once granted, the new write transaction will be placed on HSX bus 126.

On receipt of a read request from a client, two internal read commands are generated one is placed in a two-deep read command FIFO buffer 104 for HSX master module 118 and one is placed in two-deep read command FIFO buffer 120 for HSX slave module 102. Read command FIFO buffer 104 makes a request to HSX master module 118, which is arbitrated by read/write arbiter 116 between read and write requests, because HSX master module 118 is shared. Once granted, the new read transaction will be placed on HSX bus 126. Data read back from HSX bus 126 is placed in the input read data FIFO buffer 120. As soon there is sufficient read data (such as a whole block) in input read data FIFO buffer 120, the AES decryption proceeds. As the data is decrypted it is placed in output read data FIFO buffer 124 together with the associated read command already present. Once all the read data has been decrypted, the read data is placed on HSX bus 126 to complete the original read request.

In both cases (encrypt and decrypt) the 128 bit AES key is derived by key generator with random seed 112 that uses the random number from the random number generator, the content ID and the address.

In addition to the standard clock, reset, manufacturing test, peripheral bus (ASX) and HSX bus 126 connections, system 100 can use other suitable signals, such as a random number request and acknowledge signal, an operating mode indicator, an interrupt or other suitable signal.

System 100 can utilize a register interface for the host to perform configuration and respond to exceptions. The register interface can be implemented on the peripheral (ASX) bus. A single interrupt can be generated and routed to the main interrupt controller.

System 100 control can be provided by use of a dedicated register. A protected system can be configured not to operate until the enable bit is set. If disabled, any data written is discarded, and any data read will return zeros. This bit can be ignored if a protected mode input signal is asserted and enable is enforced. The reset bit can be used to cause all the contexts to be reset and discarded, and can be self clearing. The encryption bit can be used to enable memory transaction interception and encryption. If disabled, the transactions can occur in the clear. This bit can be ignored if the protected mode input signal is asserted and encryption is enforced.

System 100 can also include a status register that can be used to determine system 100 status, such as where a write context has been lost, where a read/write collision has occurred, for read or write errors, or for other suitable data.

System 100 can also include an interrupt enable register can be used to determine interrupt status, and a context status register that can be used to monitor system 100 context status, such as to show the most recent context to cause an error, for debugging purposes or other suitable purposes.

System 100 interacts with the transport stream processor, which supports the extended HSX attributes for system 100. These attributes are enforced by the transport stream processor to ensure that content is protected as appropriate. The transport stream processor generates a unique content ID for each elementary stream. The content ID is derived from the key index used to decrypt the incoming data (i.e. the key used to decrypt the external broadcast encryption used to protect the content as it is transmitted through the network). These keys are generally unique for each elementary stream and therefore the key indices used to store these keys in the transport stream processor are unique, such that the content IDs are unique.

The audio and video decoders are modified to support system 100 to allow the encoded bitstream interface to communicate with system 100. The host CPU can configure the decoders to use system 100 by requesting the decoder hardware to assert an HSX attribute bits protected encoded content bit. At the same time the host CPU will supply the appropriate content ID.

The decoder hardware ensures that all decoded data written out to external memory can have the HSX attribute bits protected decoded content bit asserted if the HSX attribute bits protected encoded content bit is set and can ensure that the same content ID is used.

An HSX attribute bits protected decoded content can be used to protect the decoded content in external memory using a light encryption ("obfuscation") technology in the memory controller, which allows the content ID association to be maintained throughout the system.

The bitstream interface supports a mode where bitstream fetches only ever occur on 16 byte boundaries and are multiples of 16 bytes in length.

The memory controller does not respond to transactions where the HSX attribute bits protected encoded content attribute is set. This allows these transactions to be intercepted by system 100. The memory controller can respond to the HSX attribute bits protected decoded content bit which is used protect the decoded content in external memory using a light encryption ("obfuscation") technology in the memory controller.

Figure 2:
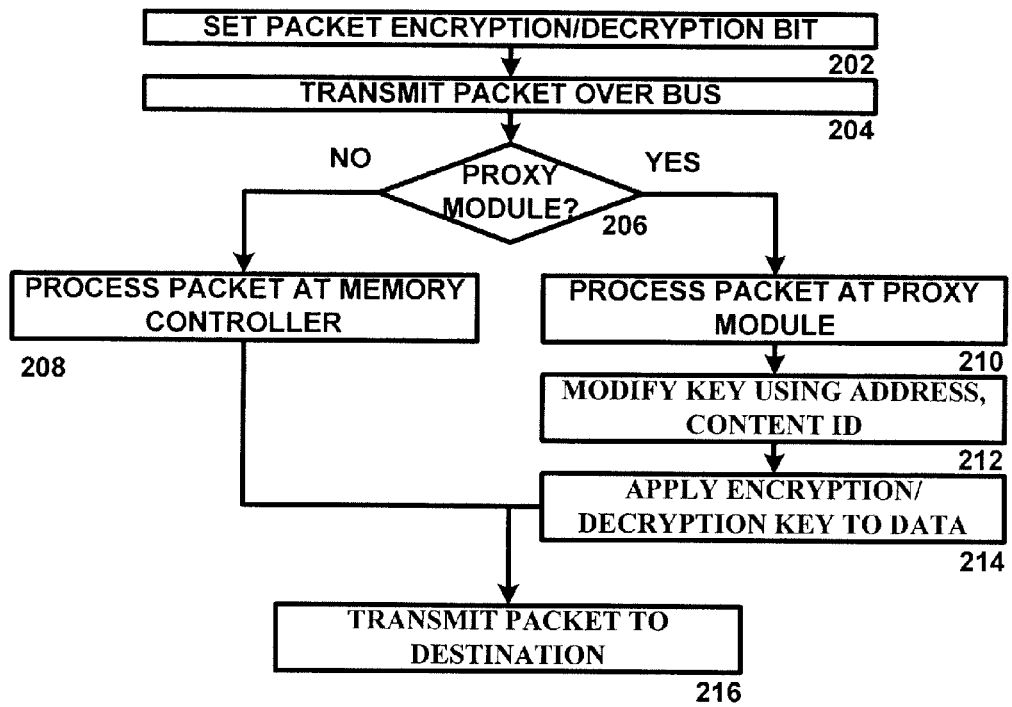
FIG. 2 is a flow chart of a method for protecting content in accordance with an exemplary embodiment of the present invention.

FIG. 2 is a flow chart of a method 200 for protecting content in accordance with an exemplary embodiment of the present invention. Method 200 begins at 202, and encryption or decryption bit for a data packet is set by a transport stream processor or other suitable systems. The method then proceeds to 204, where the data packet is transmitted over a system bus. At 206, it is determined whether to process the data packet using a dedicated proxy module for providing secure encryption and decryption, such as by detecting whether the data packet encryption or decryption bit has a predetermined value. Detection can be performed at the proxy module, the memory controller, or other suitable systems, such as where both the proxy module and the memory controller receive but do not process data packets having an incorrect bit setting. If it is determined that the proxy module should not process the data packet, the method proceeds to 208 and the data packet is processed at the memory controller, such as to determine a destination for the data packet. Otherwise, the method proceeds to 210.

At 210, the data packet is processed at the proxy module, such as by reading address and packet identification data, determining whether the data packet should be encrypted or decrypted, or in other suitable manners. The method then proceeds to 212, where an encryption/decryption key is modified using the data packet address and content ID, as well as a hashing algorithm. The method then proceeds to 214, where the modified key is applied to the data packet to encrypt or decrypt the data. The method then proceeds to 216, where the packet is transmitted to a destination, such as a data storage device, an audio or video decoder, a memory controller, or other suitable destinations.

Figure 3:
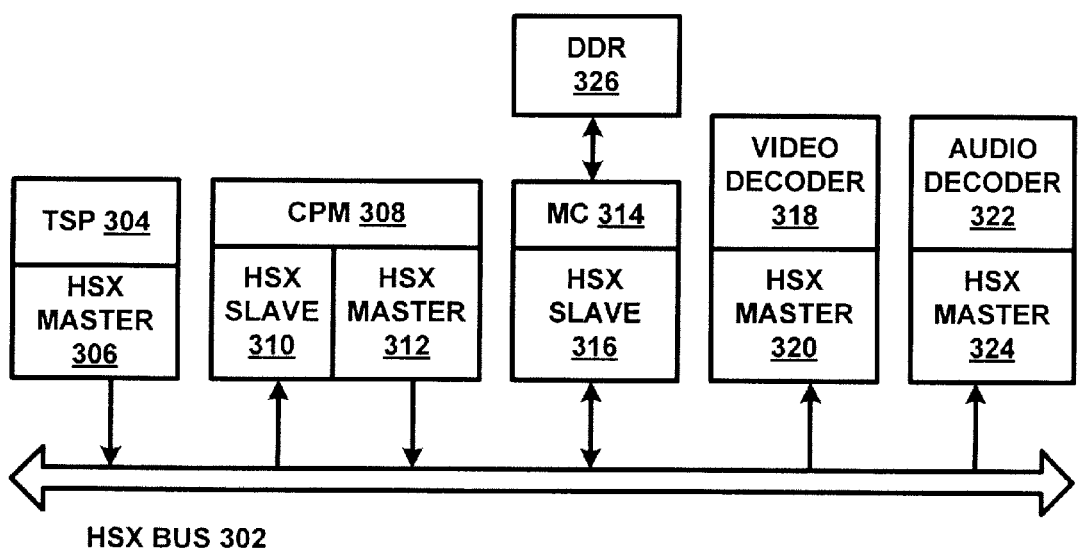
FIG. 3 is a diagram of a system utilizing a crypto proxy module in accordance with an exemplary embodiment of the present invention.

FIG. 3 is a diagram of a system 300 utilizing a crypto proxy module in accordance with an exemplary embodiment of the present invention. System 300 includes high speed (HSX) bus 302, which transfers data between the components of system 300. Transport stream processor (TSP) 304 transmits data to high speed bus 302 using HSX master 306, such as to transmit clear or unencrypted data to HSX slave 310 of crypto proxy module (CPM) 308. Crypto proxy module 308 then encrypts the data, and transmits the encrypted data from HSX master 312 to HSX slave 316 of memory controller (MC) 314, which stores the encrypted data in dual data rate (DDR) system memory 326. When the stored data is to be decoded, such as for playback, memory controller 314 extracts the data from dual data rate system memory 326 and transmits the data from HSX slave 316 to HSX slave 310, which then provides the data to crypto proxy module 308 for decrypting. The clear or decrypted data is then transmitted by crypto proxy module 308 through HSX master 312 to HSX master 320 for provision to video decoder 318, or to HSX master 324 for provision to audio decoder 322. In this manner, data can be protected through encryption processes that are controlled by secure components such as transport stream processor 304 and crypto proxy module 308 without requiring resources of memory controller 314, which can also expose the data to external attack.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the claimed subject matter is to be determined by the broadest permissible interpretation of the following claims and their equivalents, and shall not be restricted or limited by the foregoing detailed description.

What is claimed is:

1. A system for encrypting and decrypting data comprising:
    a client for receiving a data packet, setting a value of a crypto bit, and transmitting the data packet over a system bus;
    a crypto module for receiving the data packet from the system bus and performing a cryptology function on the data packet based on a first value of the crypto bit; and
    a memory controller for receiving the data packet from the system bus and performing non-cryptology functions on the data packet based on a second value of the crypto bit;
    wherein the cryptology function comprises:
        performing initial processing including reading the data packet and determining whether or not the data packet should be encrypted or decrypted;
        modifying an encryption/decryption key using an address and a content ID of the data packet as well as a hashing algorithm; and
        applying the modified key to the data packet to encrypt or decrypt data within the data packet.

2. The system of claim 1 wherein the crypto module further comprises a key generator for receiving a random number key and modifying the random number key based on predetermined fields of the data packet.

3. The system of claim 2 wherein the crypto module further comprises a bus slave module for controlling read and write operations between the system bus and the crypto module in response to client data.

4. The system of claim 3 wherein the crypto module further comprises a bus master module for controlling read and write operations between the system bus and the crypto module in response to data generated by the crypto module.

5. The system of claim 4 wherein the crypto module further comprises a read/write arbiter for determining a priority between read operations and write operations of the crypto module.

6. The system of claim 1 wherein the client comprises one or more of a transport stream processor, an audio decoder and a video decoder.

7. The system of claim 2 further comprising a transport stream processor for assigning a content ID for the data packet, wherein the key generator modifies the random number key based on the content ID of the data packet.

8. A method for encrypting and decrypting data comprising:
    setting a crypto bit of a data packet to control encryption and decryption of the data packet;
    transmitting the data packet over a system bus;
    performing a proxy determination to determine if the data packet will be processed by a dedicated crypto module or by a memory controller as a function of the crypto bit;
    processing the data packet with the dedicated crypto module based on a first value of the crypto bit; and
    processing the data packet with the memory controller based on a second value of the crypto bit;
    wherein the processing at the crypto module includes a cryptology function comprising:
        performing initial processing including reading the data packet and determining whether or not the data packet should be encrypted or decrypted;
        modifying an encryption/decryption key using an address and a content ID of the data packet as well as a hashing algorithm; and
        applying the modified key to the data packet to encrypt or decrypt data within the data packet;
    wherein both the crypto module and the memory controller receive but do not process data packets having an incorrect setting of the crypto bit.

9. The method of claim 8 wherein processing the data packet with the dedicated crypto module based on the first value of the crypto bit comprises reading or writing the data packet from or to the system bus using a bus interface slave module based on data received from a client.

10. The method of claim 9 wherein processing the data packet with the dedicated crypto module based on the first value of the crypto bit comprises reading or writing the data packet from or to the system bus using a bus interface master module based on data generated by the crypto module.

11. The method of claim 10 wherein processing the data packet with the dedicated crypto module based on the first value of the crypto bit comprises encrypting the data packet using a key modified using predetermined data attributes of the data packet.

12. The method of claim 11 wherein processing the data packet with the dedicated crypto module based on the first value of the crypto bit comprises decrypting the data packet using a key modified using predetermined data attributes of the data packet.

13. A system for encrypting and decrypting data comprising:
    a client for receiving a data packet, setting a value of a crypto bit, and transmitting the data packet over a system bus;
    at least one component that receives the data packet from the system bus and performs a cryptology function on the data packet based on a first value of the crypto bit; and
    a memory controller for receiving the data packet from the system bus and performing non-cryptology functions on the data packet based on a second value of the crypto bit;
    wherein the cryptology function comprises:
        performing initial processing including reading the data packet and determining whether or not the data packet should be encrypted or decrypted;
        modifying an encryption/decryption key using an address and a content ID of the data packet as well as a hashing algorithm; and
        applying the modified key to the data packet to encrypt or decrypt data within the data packet.

14. The system of claim 13 wherein the at least one component receives a random number key and modifies the random number key based on predetermined data attributes of the data packet.

15. The system of claim 13 wherein the at least one component controls read and write operations between the system bus and the crypto module in response to client data.

16. The system of claim 13 wherein the at least one component controls read and write operations between the system bus and the crypto module in response to data generated by the crypto module.

17. The system of claim 13 wherein the at least one component determines a priority between read operations and write operations of the crypto module.

18. The system of claim 13 wherein the client comprises one or more of a transport stream processor, an audio decoder and a video decoder.

19. The system of claim 14 further comprising a transport stream processor for assigning a content ID for the data packet, wherein the at least one component modifies the random number key based on the content ID of the data packet.

20. The system of claim 13 wherein the at least one component generates a random number key and modifies the random number key based on predetermined data attributes of the data packet.

* * * * *